Nov. 2, 1943.　　　　C. M. HAMBLIN　　　　2,333,561
FLOWER HOLDER
Filed Sept. 23, 1941
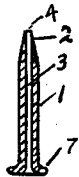　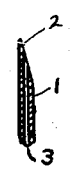　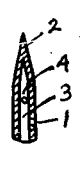　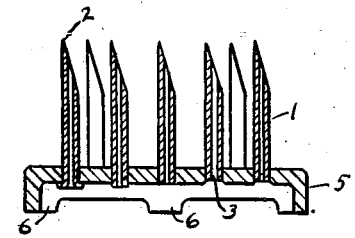
Fig.4　Fig.5　Fig.6　　Fig.3
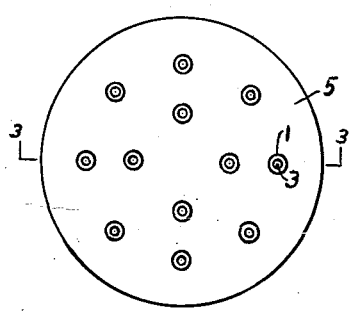　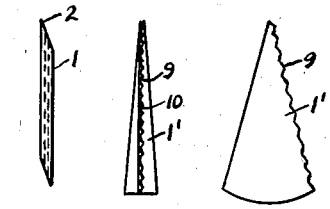
Fig.7　Fig.8　Fig.9
Fig.2
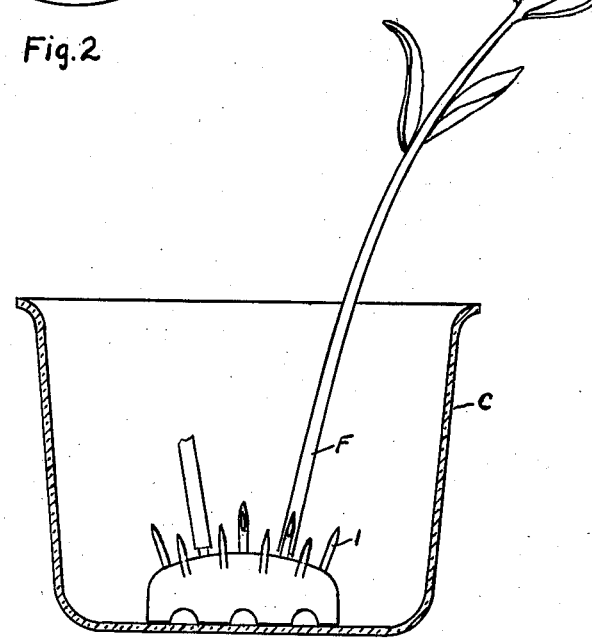
Fig.1
CLYDE M. HAMBLIN
INVENTOR
BY 
ATTORNEY Patented Nov. 2, 1943

2,333,561

UNITED STATES PATENT OFFICE 2,333,561

FLOWER HOLDER

Clyde Malcolm Hamblin, Washington, D. C.

Application September 23, 1941, Serial No. 412,038

6 Claims. (Cl. 47—41)

This invention relates to flower holders and more particularly to holders for cut flowers.

It has long been known that the freshness of cut flowers can be greatly prolonged by the periodical clipping back of the stems.

The process of daily clipping is however tedious and where the flowers have been carefully arranged for decorative purposes this treatment involves their disarrangement.

It has also become a common practice to arrange flowers effectively in containers by the use of devices consisting generally of a base carrying a number of upwardly projecting pins upon which the stems of the flowers are impaled thus assuring that each flower will remain in its selected position.

An object of the present invention is to provide a simple device for use with cut flowers which will eliminate the necessity for clipping the stems and which will assure a free supply of water to the ducts of the stem at a point remote from the end where decay first sets in.

A further object of the invention is to provide a supporting device for cutflowers having associated means for supplying water to each individual flower and thus eliminating the necessity for periodic clipping of the stems.

Further objects will more particularly appear in the course of the following detailed description.

The invention consists in the novel construction, arrangement and combinations of parts hereinafter more particularly described and claimed.

One sheet of drawings accompanies this specification as part thereof, in which like reference characters indicate like parts throughout.

In the drawing:

Fig. 1 is a vertical cross section through a container showing the improved holder in elevation with a flower impaled.

Fig. 2 is a plan of one form of holder.

Fig. 3 is a vertical cross section taken on line 3—3 of Fig. 2.

Fig. 4 is a vertical cross section through one form of tube.

Fig. 5 is a fragmentary vertical cross section through a modified form of tube.

Fig. 6 is a fragmentary vertical cross section through another modified form of tube.

Figs. 7, 8 and 9 are side elevations of further forms of tubes.

Referring to the drawing, 1 indicates a tubular needle or quill having at least one end pointed as at 2 and its bore open at or near both ends. In Fig. 4 is shown such a quill with the bore 3 opening directly at both ends and with the lower end swaged out as at 7 to provide a base. In Fig. 5 a modified form is shown in which the upper end is cut away obliquely. In Fig. 6 the point 2 is solid and the bore 3 opens laterally at 4 near the upper end. In Fig. 7 both ends of the quill are cut away obliquely so that the exposed mouths of the bore will be exposed laterally. In Fig. 9 is shown a conical shaped blank having its angular sides serrated as at 9 which can be rolled into a conical member as shown in Fig. 8 the serrated edges forming an irregular slot 10.

By spacing the openings of the bore from the ends of the quills and exposing such openings laterally, two functions are obtained. The lateral opening spaced from the penetration point is much less likely to become clogged when pithy plants are impaled than when the opening is directly at the point. The lateral opening spaced from the opposite or bottom end permits that end to rest directly on the bottom of the vase to support the flower without closing the vent.

As illustrated in Figs. 1 and 3 a plurality of the quills may be associated with a base 5 prefably formed with feet 6 by means of which water will circulate freely under the base and to the lower exposed ends of the bores 3. The quills may be arranged at any desired angularity to support the flowers F as desired in a container C.

The quills may be made from tubing or rolled sheet material or may be cast or otherwise formed independently or in association with the base. Metal or suitable plastics may be utilized and various modifications will readily suggest themselves to those skilled in the art but within the scope of the present invention.

Having thus fully described my invention I claim:

1. A flower support comprising a base, a plurality of upwardly projecting tubular splines carried by the base, the bore of each spine being exposed laterally adjacent its upper pointed end and means for supporting the base in a container to permit access for the contents of the container to the bores of the spines at their lower ends.

2. A device for supporting and supplying water to the interior of cut flower steps consisting of a short tube pointed at one end and having its bore vented laterally intermediate its ends.

3. A device for supporting and supplying water to the interior of cut flower stems consisting of a short tube with obliquely tapered ends forming points and exposing the bore laterally.

4. A device for supporting and supplying water to the interior of cut flower stems consisting of a short pointed tube formed of sheet material with the adjacent longitudinal edges spaced to provide one or more lateral openings to the bore.

5. A device for supporting and supplying water to the interior of cut flower stems consisting of sheet material formed as a cone having a slot extending from the apex to the base.

6. A flower support comprising a base formed with a top and lateral passages whereby water may circulate freely under the top when it is submerged and a plurality of spaced, pointed tubular members extending upwardly from the top, the bores of said tubes communicating with the area beneath the top, whereby flowers impaled on said tubes may draw water freely from around the base when the latter is submerged in a container.

CLYDE M. HAMBLIN.